United States Patent [19]
Johnson et al.

[11] Patent Number: 5,600,828
[45] Date of Patent: Feb. 4, 1997

[54] FILE SPECIFICATION WILDCARD

[75] Inventors: William J. Johnson, Flower Mound; Owen W. Weber, Coppell, both of Tex.

[73] Assignee: International Business Machines Corporation, Armonk, N.Y.

[21] Appl. No.: 276,017

[22] Filed: Jul. 15, 1994

[51] Int. Cl.⁶ .................................................. G06F 17/30
[52] U.S. Cl. .................................... 395/601; 364/DIG. 1; 364/282.3; 364/282.1; 364/283.3
[58] Field of Search ............................................. 395/600

[56] References Cited

U.S. PATENT DOCUMENTS 5,412,807  5/1995  Moreland ................................. 395/600

OTHER PUBLICATIONS

Waite et al, UNIX Primer Plus, Howard W. Sams & Co, 1990, pp. 216–221.

*Primary Examiner*—Wayne Amsbury
*Attorney, Agent, or Firm*—Edward H. Duffield; Andrew J. Dillon

[57] ABSTRACT

A method for performing commands on a plurality of files, which each has a unique file identifier, in a computer system is disclosed. The method first searches the plurality of files using a first set of predicates containing a wildcard variable. Next, the system stores any and all file matches. Further, the system then may perform a search of the plurality of files using a second set of predicates based on a second wildcard variable. The system stores any and all file matches based on the second set of predicates with the second wildcard variable. The system performs the command on the stored file matches found. The wildcard may act as either an inclusive or an exclusive OR function to find all possible matches, depending upon the wildcard selected by the user.

4 Claims, 3 Drawing Sheets

FILE SPECIFICATION WILDCARD

BACKGROUND OF THE INVENTION

1. Technical Field

The present invention generally relates to a data processing system, and, more particularly to a computer system wildcard used for facilitating file matching. More particularly still, the invention relates to a computer software command structure with an enhanced file specification wildcard that allows the user to specify multiple predicates in a file list function.

2. Description of the Related Art

Computer command structures allow a user to display a list of files matching a wildcard definition. For example, a user may want to see all of the files with a file name beginning with "A" and a file type beginning with "B," then the user issues the command:

DIR A*.B* (in a PC DOS environment)

or fulist A* B* * (in a VM CMS environment)

This command structure, however, is inadequate for certain desired inquiries. For example, a user may want to see all the files associated with a particular application, such as, for example, the ABC application. The user knows that some of the desired files have file NAMES beginning with ABC, but other files have file TYPES beginning with CBA. The user would then have to issue multiple file list commands to locate the desired files.

Accordingly, what is needed is a method for accessing all files matching any of the multiple predicates with a single command.

SUMMARY OF THE INVENTION

It is therefore one object of the present invention to provide a data file processing system.

It is another object of the present invention to provide a computer system wildcard used for facilitating file matching.

It is yet another object of the present invention to provide a computer software command structure with an enhanced file specification wildcard that allows the user to specify multiple predicates in a file access function.

The foregoing objects are achieved as is now described. According to the present invention, a method for performing commands on a plurality of files, which each has a unique file identifier, in a computer system is disclosed. The method first determines a set of predicates associated with a wildcard specification and then searches the plurality of files. Next, the system stores any and all file matches based on the predicates with the wildcard variable. Then, the system stores any and all file matches. The system performs the command on the stored file matches found. One wildcard embodiment acts as an inclusive OR function to find all possible matches. Another embodiment acts as an exclusive OR function.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
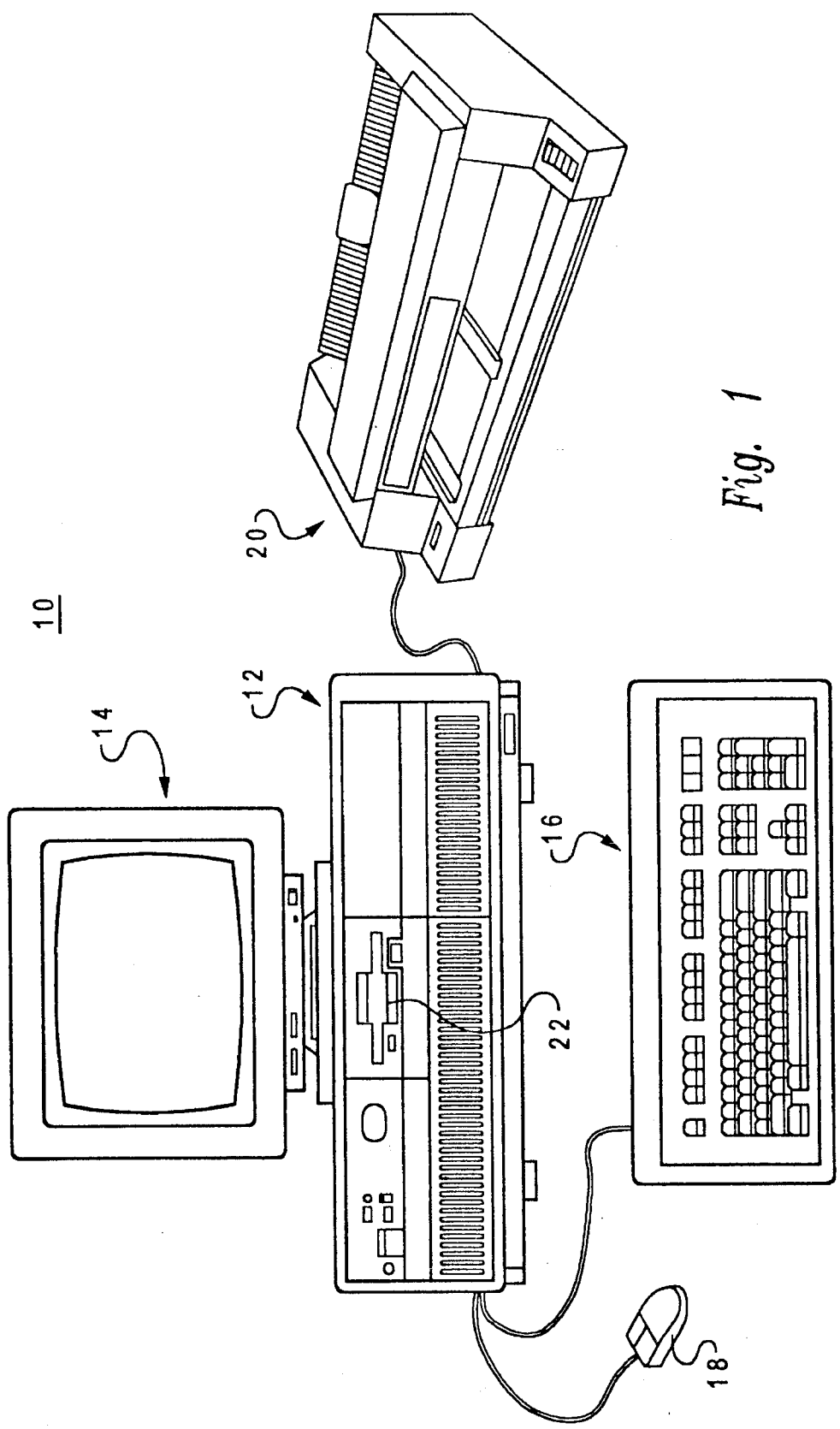
FIG. 1 depicts a personal computer, which contains a data processing system in the form of which the present invention can be employed.

Referring now to the figures, and in particular to FIG. 1, a personal computer system 10, which contains a data processing system in which the present invention can be employed, is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22. The data processing system is code or programming implemented, which may be stored on media such as a floppy disk, which can be inserted in a floppy diskette drive 22, or stored on a hard disk connected to personal computer 10. The data processing system drives and coordinates all components and interfaces with the user.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST. A personal computer system is only one form of hardware, upon which the present invention may be implemented.

Figure 2:
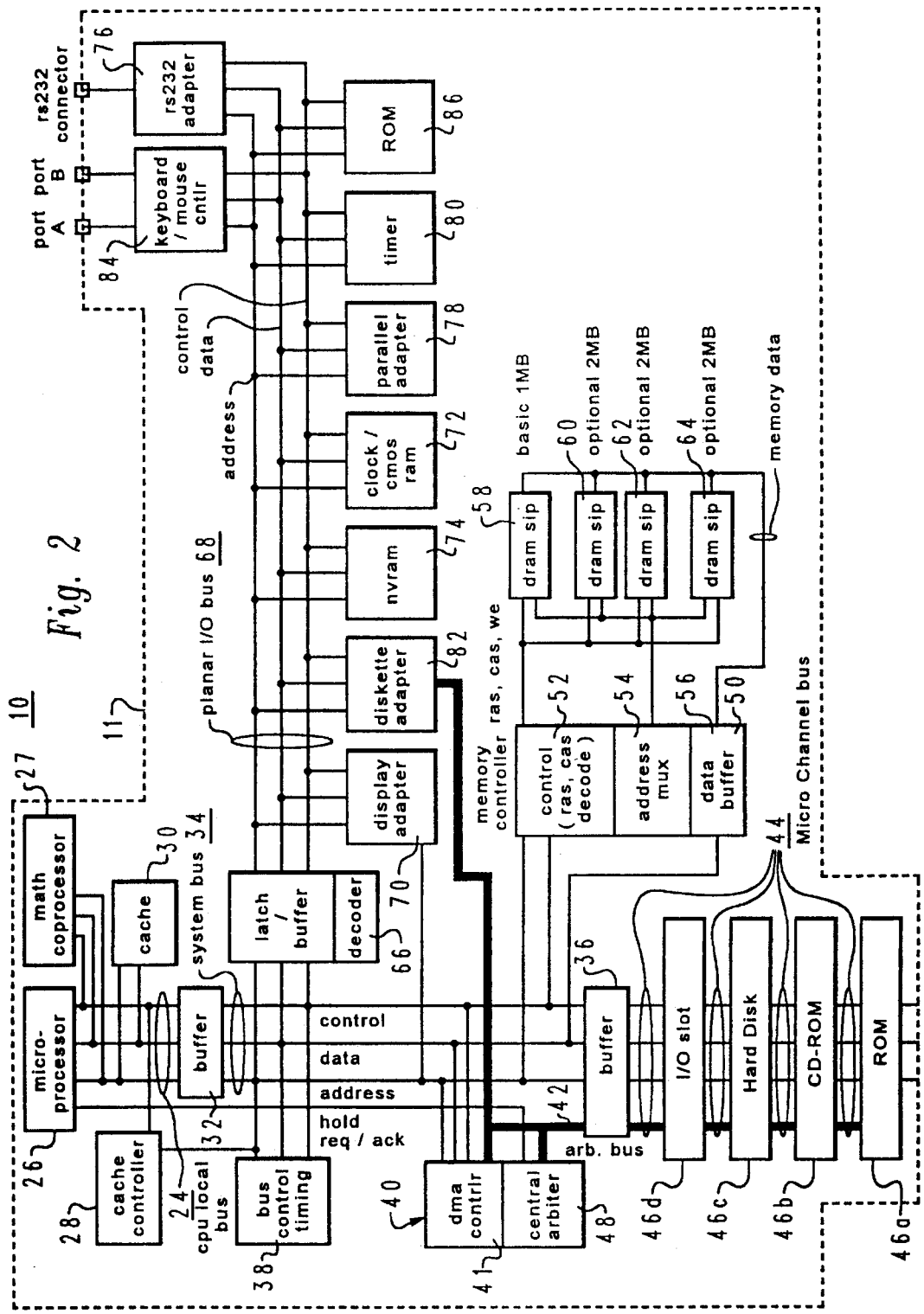
FIG. 2 is a block diagram of a personal computer system illustrating the various components of a personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64. Those skilled in the art would understand that a data processing system is code or programming implementation, which executes in computer memory.

A further buffer 66 is coupled between system bus 34 and a planar I/0 bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a R8232 adapter 76, a parallel adapter 78, a plurality of timers 80, a diskette adapter 82; a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/ mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
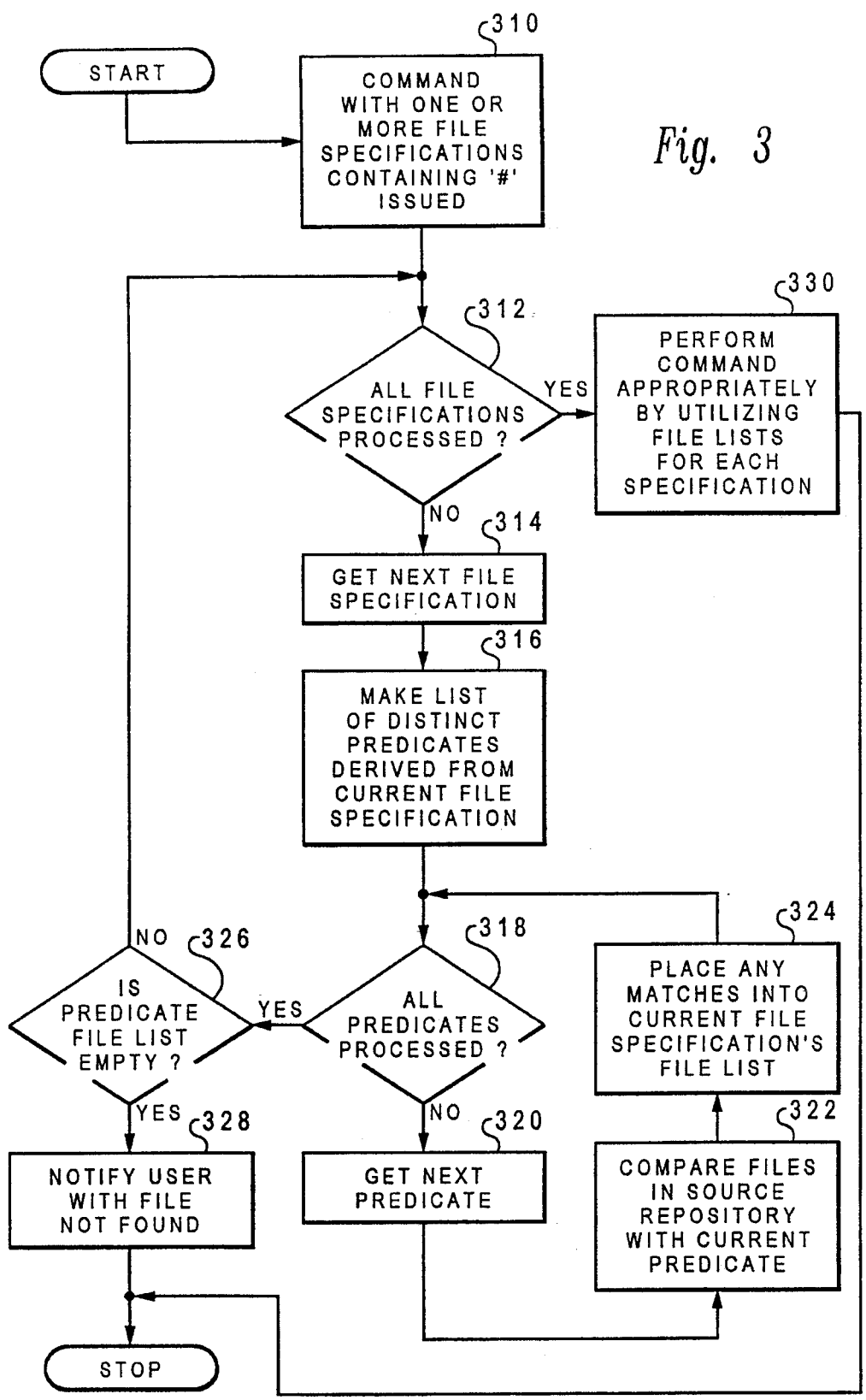
FIG. 3 depicts a flowchart for an improved method for easily listing all files matching any of the multiple predicates with a single command.

FIG. 3 illustrates a flowchart for an improved method, which is performed by the data processing system on the computer system, for easily accessing all files matching any of the multiple predicates with a single command. The method uses a wildcard command, such as, for example, the symbol "#," to allow the user to specify multiple predicates with a "OR" function. For example, if the user desires to see all files with a file NAME beginning with ABC, OR a file TYPE beginning with CBA, the user enters the following command:

DIR ABC#.CBA#

The system recognizes the pound sign as a wildcard, but it interprets the pound sign as an inclusive OR function, such that all files with either an ABC* file name, or a CBA* file type are to be displayed. The following list is an example of the desired output that was not possible to be produced without the improved wildcard according to the present invention:

```
ABCLIST.EXE
ABCUPDT.EXE
BOB.CBADATA
JANE.CBADATA
ABCDELT.CMD
```

A second embodiment would allow a query such as:

DIR A#B#CDE.F#G#HIJ which would match any files with a file name of "ADE," "BDE," or "CDE," or a file type of "FIJ," "GIJ," or "HIJ." It should be appreciated that an exclusive OR function may be implemented by way of an alternative wildcard function symbol, for example, "@". Thus, if "@" is placed in:

DIR ABC@.CBA@, the desired output would produce files having "ABC" in the file name or having "CBA" in the file extension, but not having both.

In FIG. 3, block 310 receives a command with one or more file specifications containing the wildcard function "#" issued. Next, in block 312, the system determines whether all file specifications have been processed. If not, the system, in block 314, gets the next file specification and makes a list, in block 316, of all distinct predicates derived from the current file specification. Once this is accomplished, the system, in block 318, determines if all predicates have been processed. If all predicates have not been processed, the system, in block 320, gets the next predicate. In block 322, the system compares the files in a source repository being used to contain all current predicates. A source repository will consist of one or more directories that may be stored across a plurality of devices. In block 324, the system then places any matches from block 322 into the current file specification's file list. After which, the system returns to block 318.

If, in block 318, all predicates have been processed, the system, in block 326, determines if the predicate file list is empty. If it is, in block 328, the system notifies the user with the message "File not found." Then the system ends. Any one file specification that produces no matched files results in an encounter in block 328. If the predicate file list is not empty in block 326, the system returns to block 312. If, in block 312, all file specifications have been processed, the system then performs the command, in block 330, which is appropriate, by utilizing the file lists for each specification. Upon completion, the system stops.

The wildcard function is not limited to a file list operation as given in the above examples. The wildcard function is also useful in any command that uses a file specification wildcard, for example, a copy command such as:

COPY ABC#.CBA#A:, which copies all files with a file name starting with "ABC," as well as all files with a file type starting with "CBA."

While the invention has been particularly shown and described with reference to a preferred embodiment, it will be understood by those skilled in the art that various changes in form and detail may be made therein without departing from the spirit and scope of the invention.

What is claimed is:

1. A method for performing a command specifying a file specification in a data processing system on a plurality of files, wherein each file has a unique identifier, said method comprising the steps of:

determining a set of predicates having at least one inclusive OR or one exclusive OR wildcard, but not both, derived from said file specification which is achieved for an exclusive OR function using a second predicate of said file specification;

determining said plurality of files by comparing files found within said data processing system to said set of predicates; and performing said command on said plurality of files.

2. The method according to claim 1 wherein determining a set of predicates derived from said file specification is achieved by at least an additional inclusive OR function.

3. A data processing system for performing a command specifying a file specification on a plurality of files stored within said data processing system, wherein each file has a unique identifier, said data processing system comprising:

means for determining a set of predicates having at least one inclusive OR or one exclusive OR wildcard, but not both, derived from said file specifications which is achieved for an exclusive OR function using a second predicate of said file specification;

means for determining said plurality of files by comparing files found within said data processing system to said set of predicates; and means for performing said command on said plurality of files.

4. The method according to claim 3 wherein determining a set of predicates derived from said file specification is achieved by at least an additional inclusive OR function.

\* \* \* \* \*